(12) United States Patent
Kumar et al.

(10) Patent No.: US 8,294,306 B2
(45) Date of Patent: Oct. 23, 2012

(54) DC CAPACITOR BALANCING

(75) Inventors: Mahesh Kumar, Tamilnadu (IN);
Srikanthan Sridharan, Tamilnadu (IN);
Jaganath Krishnan, Tamilnadu (IN)

(73) Assignee: Indian Institute of Technology Madras, Tamilnadu (IN)

(*) Notice: Subject to any disclaimer, the term of this patent is extended or adjusted under 35 U.S.C. 154(b) by 361 days.

(21) Appl. No.: 12/725,053

(22) Filed: Mar. 16, 2010

(65) Prior Publication Data

US 2011/0227422 A1 Sep. 22, 2011

(51) Int. Cl.
*H01H 9/54* (2006.01)
(52) U.S. Cl. .................................... 307/140
(58) Field of Classification Search .............. 307/140
See application file for complete search history.

(56) References Cited

U.S. PATENT DOCUMENTS 6,031,738 A 2/2000 Lipo et al.
2005/0017699 A1* 1/2005 Stanley ................... 323/282

OTHER PUBLICATIONS

Demirkutlu, E., "Output Voltage Control of a Four-Leg Inverter Based Three-Phase UPS by Means of Stationary Frame Resonant Filter Banks," IEEE-IEMDC2007, Antalya-Turkey, May 2-5, 2007, pp. 880-885.
Kazmierkowski, M., "Current Control Techniques for Three-Phase Voltage-Source PWM Converters: A Survey," IEEE Transactions on Industrial Electronics, vol. 45, No. 5, Oct. 1998, pp. 691-703.
Mishra, M., "A New Closed Loop Control Scheme for Capacitor Voltage Equalisation in Shunt Compensator Using Neutral Current Injection," Power Engineering Society Winter Meeting, 2001, IEEE, vol. 1, pp. 126-131.
Mishra, M., "A New Statcom Topology to Compensate Loads Containing AC and DC Components," Power Engineering Society Winter Meeting, 2000, IEEE, vol. 4, pp. 2636-2641.
Mishra, M., "Control Schemes for Equalization of Capacitor Voltages in Neutral Clamped Shunt Compensator," IEEE Transactions on Power Delivery, vol. 18, No. 2, Apr. 2003, pp. 538-544.
Mishra, M., "Control Strategies for Capacitor Voltage Equalization in Neutral Clamped Shunt Compensator," Power Engineering Society Winter Meeting, 2001, IEEE, vol. 1, pp. 132-137.
Rodriguez, J., "Multilevel Inverters: A Survey of Topologies, Controls, and Applications," IEEE Transactions on Industrial Electronics, vol. 49, No. 4, Aug. 2002, pp. 724-738.
Srikanthan, S., "Capacitor Voltage Balancing in Neutral Clamped Inverters for DSTATCOM Application," Power Engineering, Energy and Electrical Drives, 2009. POWERENG '09, pp. 558-563, Published Mar. 18-20, 2009.

(Continued)

*Primary Examiner* — Robert L. DeBeradinis
(74) *Attorney, Agent, or Firm* — Steven S. Rubin, Esq.; Moritt Hock & Hamroff LLP

(57) ABSTRACT

Methods and devices for balancing voltages of capacitors in an electronic circuit are provided. The device includes a chopper circuit having a chopper inductor. Further, the chopper circuit may detect voltages across capacitors as well as an output current of the electronic circuit. In addition, the device may include a chopper control unit receiving the output current then generating a signal representing charging of the chopper inductor based on the output current. Also, the chopper control unit may receive the voltages across the capacitors and detect an imbalance between the voltages based on a polarity of the output current. Additionally, the chopper control unit may transfer of charge between the two capacitors, using the chopper inductor. Further, the chopper inductor is substantially discharged, during the transfer of charge between the capacitors.

20 Claims, 10 Drawing Sheets

OTHER PUBLICATIONS

Srikanthan, S., "Capacitor Voltage Balancing in Neutral Clamped Inverters for DSTATCOM Application," Lisbon, Portugal, Mar. 18-20, 2009, pp. 558-563.

Srikanthan, S., "DC Capacitor Voltage Equalization in Neutral Clamped Inverters for DSTATCOM Application," IEEE Transactions on Industrial Electronics, vol. pp. Issue 99, pp. 1-8. May 15, 2009.

Wang, R., "Shor-Cicuit Power Analysis of an Inverer Drving an RLC Load," Poc. 2001 International Symposium on Circuits and Systems, May 2001, vol. 4, pp. IV-886-IV-889.

Somasekhar, V.T. and Gopakumar, K. "Three-level inverter configuration cascading two two-level inverters," Electric Power Applications, IEEE Proceedings, vol. 150, No. 3, May 2003, pp. 245-254.

* cited by examiner

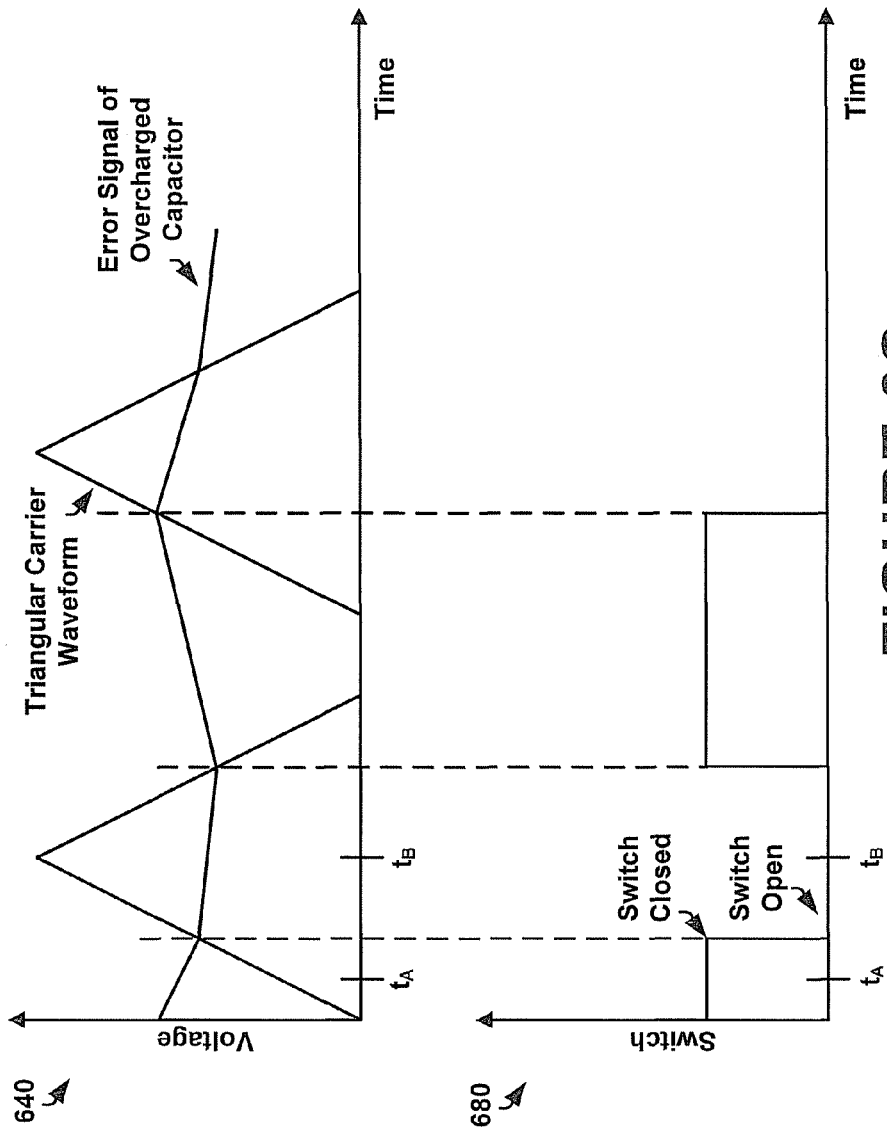

DC CAPACITOR BALANCING

BACKGROUND

Techniques for balancing voltage across capacitors may be used in several different types of electronic devices including voltage source inverters, multilevel inverters, ultra-capacitors, and capacitor banks. Multilevel inverters provide an output waveform that exhibits multiple steps at several voltage levels. Further, ultra-capacitors may be electrochemical capacitors that may have a relatively high energy density when compared to common capacitors, typically on the order of thousands of times greater than a high capacity electrolytic capacitor. In addition, ultra-capacitors may have a variety of applications, such as in "energy smoothing" and momentary-load devices. Also, ultra-capacitors have applications as energy-storage devices in vehicles as well as home solar systems.

Other electronic devices that may use voltage balancing techniques for capacitors may be groups of large, specially constructed, low-inductance high-voltage capacitors banks that may used to supply large pulses of current for many pulsed power applications. Such applications may require accumulating energy over a relatively long period of time and releasing it quickly thus increasing the instantaneous power provided to the applications. Pulsed power applications may include electromagnetic Banning, Marx generators, pulsed lasers (especially TEA lasers), pulse forming networks, radar, fusion research, and particle accelerators. Further, large capacitor banks may be used as energy sources for the exploding-bridgewire detonators or slapper detonators in nuclear weapons and other specialty weapons. Also, banks of capacitors may be used as power sources for electromagnetic armor and electromagnetic rail guns and coil guns.

Voltage source inverters (VSI) are electronic devices that convert direct current (DC) to alternating current (AC). VSIs may be used in various applications such as computer power supplies, uninterruptible power supplies (UPS), High Voltage Direct Current (HVDC) power transmission, and electric vehicles. Further, voltage source inverters may be used in applications that have a DC power source, such as batteries or solar panels. In addition, a VSI may be used in Distribution Static Compensator (DSTATCOM) applications.

An electronic device such as a VSI, for example, may be constructed in several different configurations. Depending on a configuration, DC voltages across different components of the electronic device may drift from a reference voltage, and thus, may degrade performance. Voltage drift may arise due to minor effects such as capacitor leakage, unequal delays of other devices, presence of DC components in circuit current, etc. Imbalances in voltages across different components within the electronic device may also be present.

Techniques may be implemented to reduce voltage imbalances across different components (e.g. capacitors) in the electronic device. The components may be controlled to discharge and charge the device components such that voltages across the components are substantially balanced. Sensors may also be coupled to the electronic device to measure voltages to detect a voltage imbalance as well as to measure output currents.

SUMMARY

Within embodiments described below, a device for balancing voltages of capacitors, or charge storage devices, in an electronic circuit is disclosed. The device includes a chopper circuit having a chopper inductor. Further, the chopper circuit may measure or detect the voltages across the capacitors of the electronic circuit as well as an output current of the electronic circuit. In addition, the device may include a chopper control unit receiving the output current and then generating a signal representing charging of the chopper inductor based on the output current. The signal may have a switching frequency and a duty cycle. Also, the chopper control unit may receive the voltages across the capacitors and detect an imbalance between the voltages based on a polarity of the output current. Additionally, the chopper control unit may control a transfer of charge between two or more capacitors, using the chopper inductor and the signal representing charging of the chopper inductor. Further, the chopper inductor is substantially discharged, based on the switching frequency and the duty cycle of the signal, during the transfer of charge between the capacitors.

In another aspect, the present disclosure includes a method for balancing voltages of capacitors, or charge storage devices, in an electronic circuit. The method may include receiving voltages across two or more capacitors of the electronic circuit as well as an output current of the electronic circuit. The method also includes generating a signal representing charging of a chopper inductor in a chopper circuit based on the output current. The signal may have a switching frequency and a duty cycle. The method further includes detecting an imbalance between the voltages of the capacitors based on a polarity of the output current. In addition, the method includes transferring charge between capacitors (two or more) using the chopper inductor based on the voltage imbalance and the signal representing charging of the chopper inductor. Further, the chopper inductor is substantially discharged based on the switching frequency and the duty cycle during transfer of charge between the capacitors.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6B is an example graph of a substantially triangular carrier waveform compared with the error signal from an overcharged capacitor in a voltage source inverter;

FIG. 6C is an example graph of a waveform representing a sequence of pulses generated by a chopper pulse generator to control a switch in a chopper circuit;

DETAILED DESCRIPTION

Figure 1:
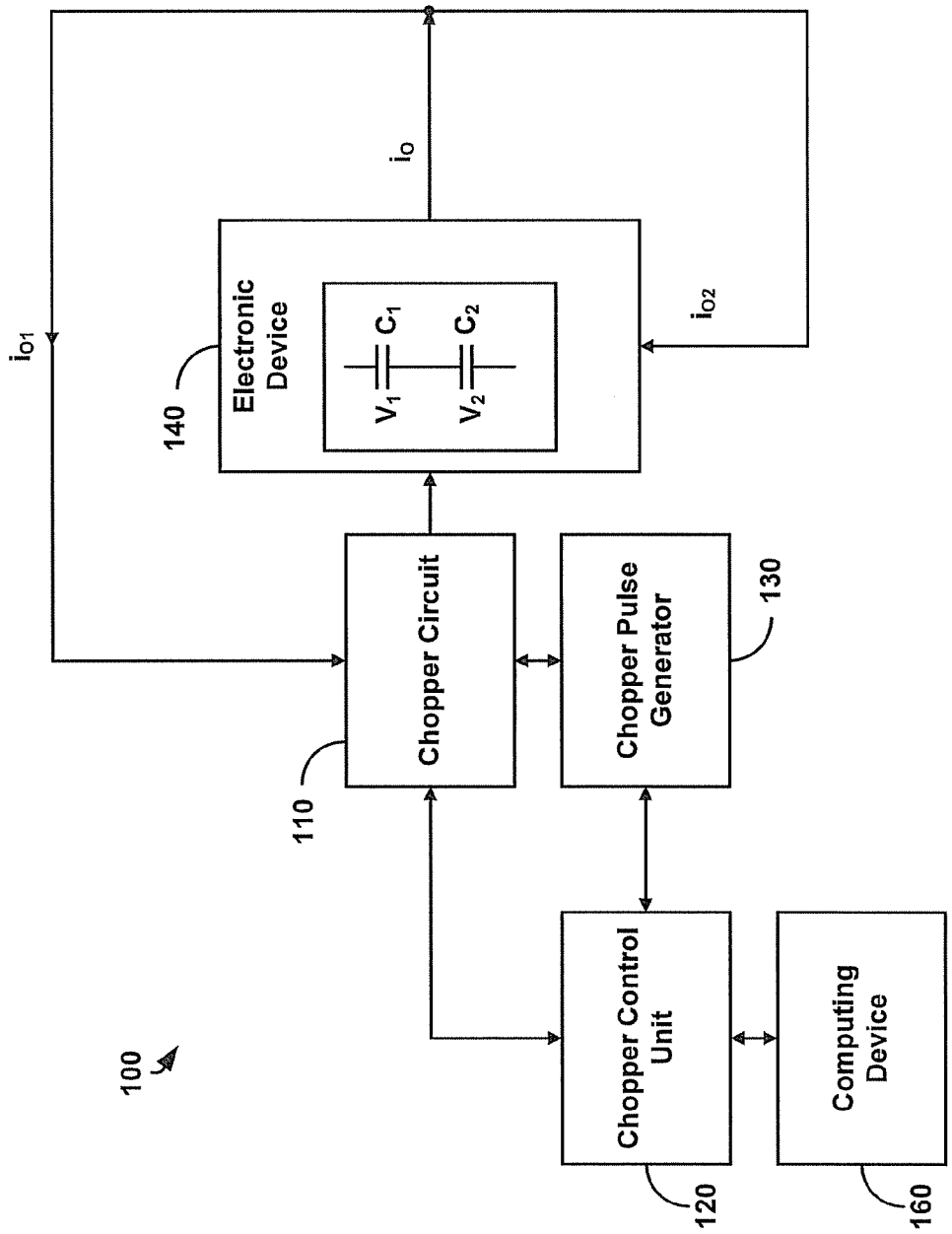
FIG. 1 is an example functional block diagram of a system to balance voltages across the capacitors of an electronic device.

In the following detailed description, reference is made to the accompanying drawings, which a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an example functional block diagram of a system 100 to balance voltages across the capacitors of an electronic device 140. The system 100 can be used in a variety of applications such that the electronic device 140 may include a multilevel inverter, ultra-capacitors, capacitor banks, and a voltage source inverter. Further, the electronic device 140 may provide an output current $i_o$. Portions of the output current $i_o$, namely $i_{o1}$ and $i_{o2}$, may be placed in feedback with the electronic device 140 or be provided to other system components (e.g. chopper circuit 110), respectively. Further, the electronic device 140 may have capacitors, $C_1$ and $C_2$. During operation of the electronic device 140, voltages of $V_1$ and $V_2$ of capacitors, $C_1$ and $C_2$, respectively, may become imbalanced. For example, due to various deleterious effects (leakage, high DC component of the output current $i_o$, etc.), capacitor $C_1$ may be overcharged, and capacitor $C_2$ may be undercharged, consequently creating a voltage imbalance between capacitors $C_1$ and $C_2$.

A chopper circuit 110 may be used to balance voltages $V_1$ and $V_2$ of capacitors, $C_1$ and $C_2$, respectively. The chopper circuit 110 may receive the output current, $i_{o1}$ as well as be coupled to electronic device 140, a chopper control unit 120 and a chopper pulse generator 130. Also, the chopper circuit 110 may use one or more switches and one or more diodes to balance the voltages of $V_1$ and $V_2$ of capacitors, $C_1$ and $C_2$, respectively. Further, the chopper circuit 110 may detect or measure the voltages of $V_1$ and $V_2$ of capacitors, $C_1$ and $C_2$, respectively, and the output current, $i_o$ using Hall effect transducers. Subsequently, the Hall effect transducers may forward $V_1$, $V_2$, and $i_o$, to the chopper control unit 120. After processing the $V_1$, $V_2$, and $i_o$ parameters, the chopper control unit 120 calculates output parameters and provides the output parameters to the chopper pulse generator 130. Based on the output parameters, the chopper pulse generator 130 controls the one or more switches within the chopper circuit 110 to balance the voltages of $V_1$ and $V_2$ of capacitors, $C_1$ and $C_2$, respectively.

In addition, a computing device 160 may be coupled to the chopper control unit 120. The computing device 160 may receive $V_1$, $V_2$, and $i_o$ parameters as well as other input parameters, process the parameters, and provide output parameters to the chopper control unit 120 to assist in balancing the voltages of $V_1$ and $V_2$ of capacitors, $C_1$ and $C_2$. Alternative embodiments may have the chopper control unit 120 and/or the chopper pulse generator 130 be part of the computing device 160.

Figure 2:
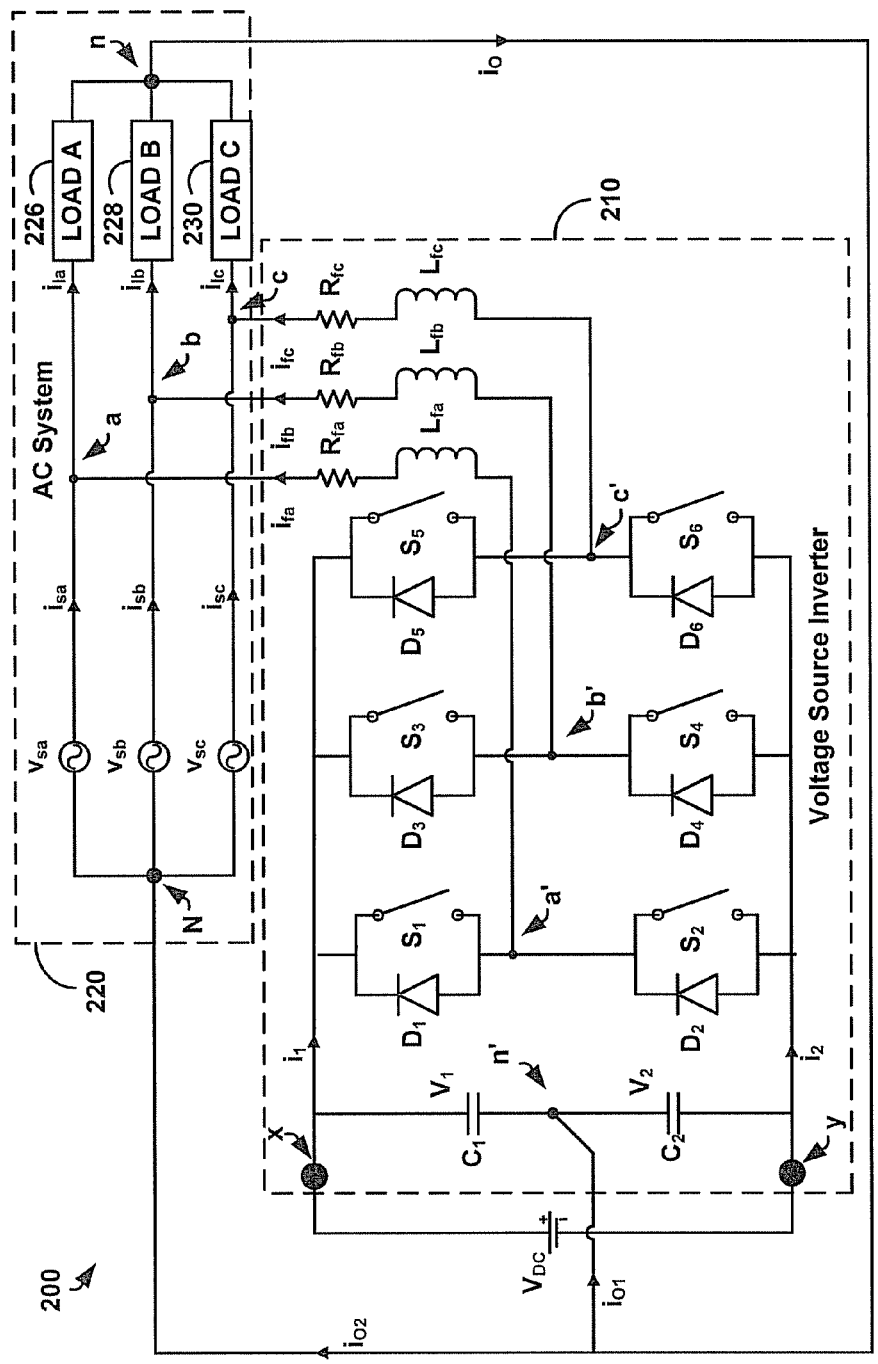
FIG. 2 is an example circuit diagram showing an application of an example capacitor balancing technique in a voltage source inverter and an AC system for a distribution static compensator application.

FIG. 2 is an example circuit diagram of an electronic device 200 that uses an example capacitor balancing system in accordance with the present disclosure, in a Distribution Static Compensator (DSTATCOM) application. A voltage source inverter (VSI) converts direct current (DC) to alternating current (AC) and may be used in various applications such as computer power supplies, HVDC power transmission, and electric vehicles as well as any application that has a DC power source, such as batteries or solar panels, that may need to be converted to an AC source.

However, in FIG. 2, the VSI is part of a DSTATCOM that may act as a shunt active filter that may operate in parallel to the load. Further, $i_{o1}$ may be equal to $i_o$ and $i_{o2}$, may be equal to zero for perfect compensation. As the load requires reactive power and contains non-linearities, harmonics are generated which may cause deleterious effects such as heating in cables, false tripping of circuit breakers, de-rating of transformers, over sizing of neutral conductors and malfunctioning of sensitive components in the electronic device 200. In order to avoid such deleterious effects, an electronic device 200 may supply a three phase balanced sinusoidal waveform. Therefore, DSTATCOM tries to supply the reactive and harmonic currents required by the load and thereby a source supplies only active current. With the control of inverter power switches ($S_1$-$S_6$) two voltage levels (+$V_{dc}$ and -$V_{dc}$) are produced For achieving desired DSTATCOM function, reference currents $i_{fa*}$, $i_{fb*}$, and $i_{fc*}$ may be generated such that reactive currents are generated from the shunt active filter (DSTATCOM). Different methods may be used for generating the reference currents such as Instantaneous Symmetrical Component Theory, Instantaneous Reactive Power Theory, Synchronous Reference Frame Theory, and a Frequency Based Approach. The electronic device 200 may use Instantaneous Symmetrical Component Theory for ease of implementation reasons and accuracy of the generated reference currents. Once the three reference currents $i_{fa*}$, $i_{fb*}$, and $i_{fc*}$ are generated, the three reference currents, $i_{fa*}$, $i_{fb*}$, and $i_{fc*}$ are tracked independently using three legs of the VSI based on a hysteresis current control method. In using the hysteresis current control, a current hysteresis band of (+h,-h) around the reference currents are generated. The VSI operates in such a manner so as to provide output currents, $i_{fa}$, $i_{fb}$, and $i_{fc}$ that track the reference currents $i_{fa*}$, $i_{fb*}$, and $i_{fc*}$ within the current hysteresis band according to the following:

$$error_k = \sum_{k=a,b,c} i_{fk*} - \sum_{k=a,b,c} i_{fk} \quad (1)$$

If $error_k \geq h$ then $u_k = -1$

Elseif $error_k \leq -h$ then $u_k = 1$

Elseif $h \leq error_k \leq -h$ then No change in $u_k$ where $i_{fk}$ is the output current of the VSI and $i_{fk}$ tracks the reference current based on $u_k$.

Figure 3:
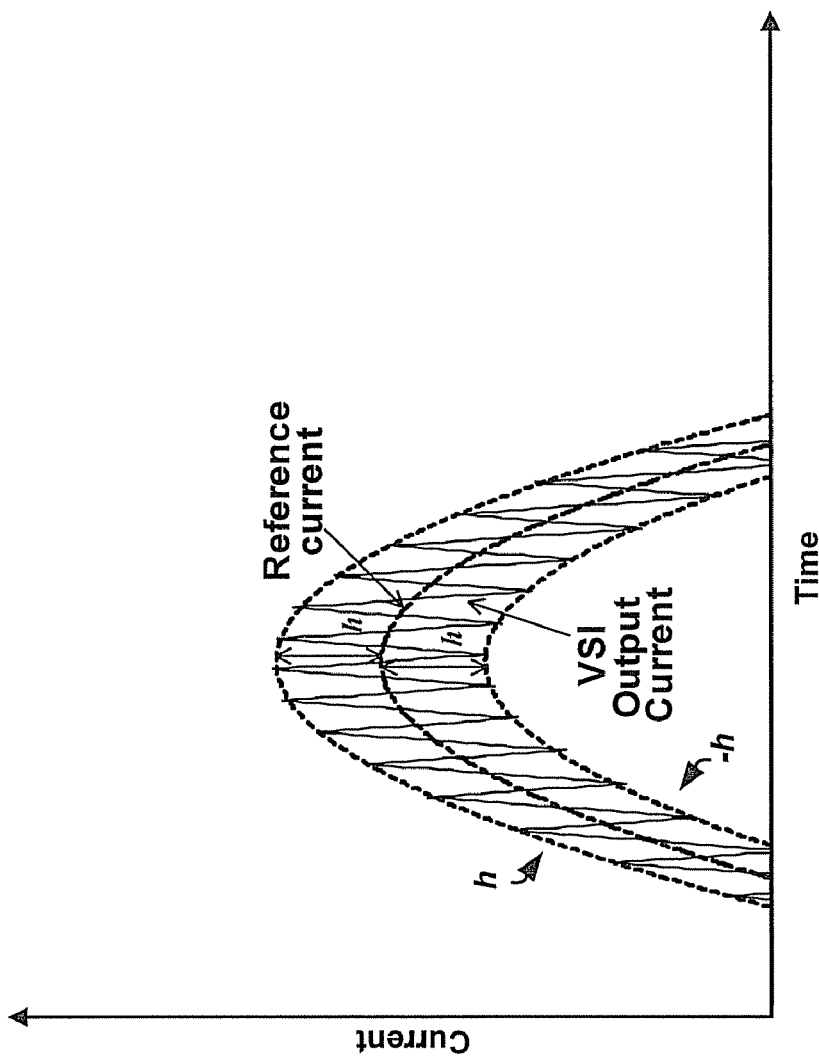
FIG. 3 is an example waveform 300 for an output current of a voltage source inverter that tracks a reference current in a Distribution Static Compensator application.

FIG. 3 is an example waveform 300 for an output current of the VSI that tracks a reference current in a Distribution Static Compensator application. The reference current is shown to be substantially in the center of the band bounded by (h,-h). The reference current may be $i_{fa*}$, $i_{fb*}$, or $i_{fc*}$. The VSI output current may be $i_{fa}$, $i_{fb}$, or $i_{fc}$.

Referring to FIG. 2, the voltage source inverter 210 may be used as the current source for the AC system 220. The DC power source $V_{DC}$ (e.g. battery) may be connected to the voltage source inverter 210 at input nodes "x" and "y". DC link or coupling capacitors, $C_1$ and $C_2$, of the VSI 210 may hold charge produced by the DC voltage source $V_{DC}$. Currents, $i_1$ and $i_2$, are produced as capacitors $C_1$ and $C_2$ are discharged. Diodes $D_1$-$D_6$ and Insulated-gate bipolar transistor (IGBT) switches $S_1$-$S_6$ are controlled in such a way to produce currents $i_{fa}$, $i_{fb}$, and $i_{fc}$, through the interface inductors $L_{fa}$, $L_{fb}$, and $L_{fc}$, respectively. In the circuit, $R_{fa}$, $R_{fb}$ and $R_{fc}$, represent resistances of the corresponding interface inductors. Further, currents $i_{fa}$, $i_{fb}$, and $i_{fc}$ are the currents between nodes a' and a, b' and b, and c' and c, respectively, that are provided to the AC system 220. Currents $i_{fa}$, $i_{fb}$, and $i_{fc}$, are combined with currents $i_{sa}$, $i_{sb}$, and $i_{sc}$ generated by model voltage sources $v_{sa}$, $v_{sb}$, and $v_{sc}$ of the AC system 220 to produce load currents $i_{la}$, $i_{lb}$, and $i_{lc}$ which are combined at node "n". Consequently, $i_o$ is the output current of the AC system 220 and is the combination of load currents $i_{la}$, $i_{lb}$, and $i_{lc}$. Furthermore, a portion of $i_o$, namely $i_{o1}$, flows from node "n" to node "n'" and is placed in feedback with the voltage source inverter 210. In addition, another portion of $i_o$, namely $i_{o2}$, flows from node "n" to node "N" and is placed in feedback with the AC system 220. Currents $i_{fa}$, $i_{fb}$, and $i_{fc}$, are produced such that load balancing takes place and the current $i_{o2}$ will be zero.

Control and coordination of the VSI switches ($S_1$-$S_6$) are based on the reference currents $i_{fa^*}$, $i_{fb^*}$, and $i_{fc^*}$ and given by equation (2) below. Further, persons of ordinary skill in the art would understand that a Proportional-Integral (PI) controller (not shown) regulates the total voltage across the two capacitors ($V_1+V_2$) around a reference value $2V_{REF}$ which may be based on $V_{DC}$. However, if the output current ($i_o$) has a DC component, the two capacitors may charge to different voltage levels, though the total voltage across the two capacitors is maintained constant. Hence, a chopper regulation circuit may be used for individual capacitor voltage balancing.

In addition, the source voltages, $v_{sa}$, $v_{sb}$, and $v_{sc}$, of the AC system 220 are assumed to be balanced and sinusoidal. Further, the load may include three phase unbalanced R-L loads, and a non-linear load similar to a full-wave diode bridge rectifier on the load side. The load currents $i_{la}$, $i_{lb}$, $i_{lc}$ are as shown in FIG. 2. The reference currents $i_{fa^*}$, $i_{fb^*}$, and $i_{fc^*}$, are extracted using the instantaneous symmetrical component theory and given as the follows equation.

$$i_{fa^*} = i_{la} - i_{sa} = i_{la} - \frac{v_{sa} + \gamma(v_{sb} - v_{sc})}{\Delta}(P_{lavg} + P_{loss}) \quad (2)$$

$$i_{fb^*} = i_{lb} - i_{sb} = i_{lb} - \frac{v_{sb} + \gamma(v_{sc} - v_{sa})}{\Delta}(P_{lavg} + P_{loss})$$

$$i_{fc^*} = i_{lc} - i_{sc} = i_{lc} - \frac{v_{sc} + \gamma(v_{sa} - v_{sb})}{\Delta}(P_{lavg} + P_{loss})$$

Where $$\Delta = \sum_{j=a,b,c} v_{sj}^2$$

and $\gamma=\tan\phi/\sqrt{3}$, $\phi$ being a desired power factor angle. For a unity power factor (UPF) operation, $\gamma=0$. Equation (2) may be used for any type of load. Persons of ordinary skill in the art would recognize that $P_{lavg}$, represents the average or mean power of the load is obtained through a moving average filter. The losses of the VSI 210, ($P_{loss}$) are generated using a capacitor voltage PI controller. Consequently, reference currents are then realized using the VSI from equation (1).

Figure 4:
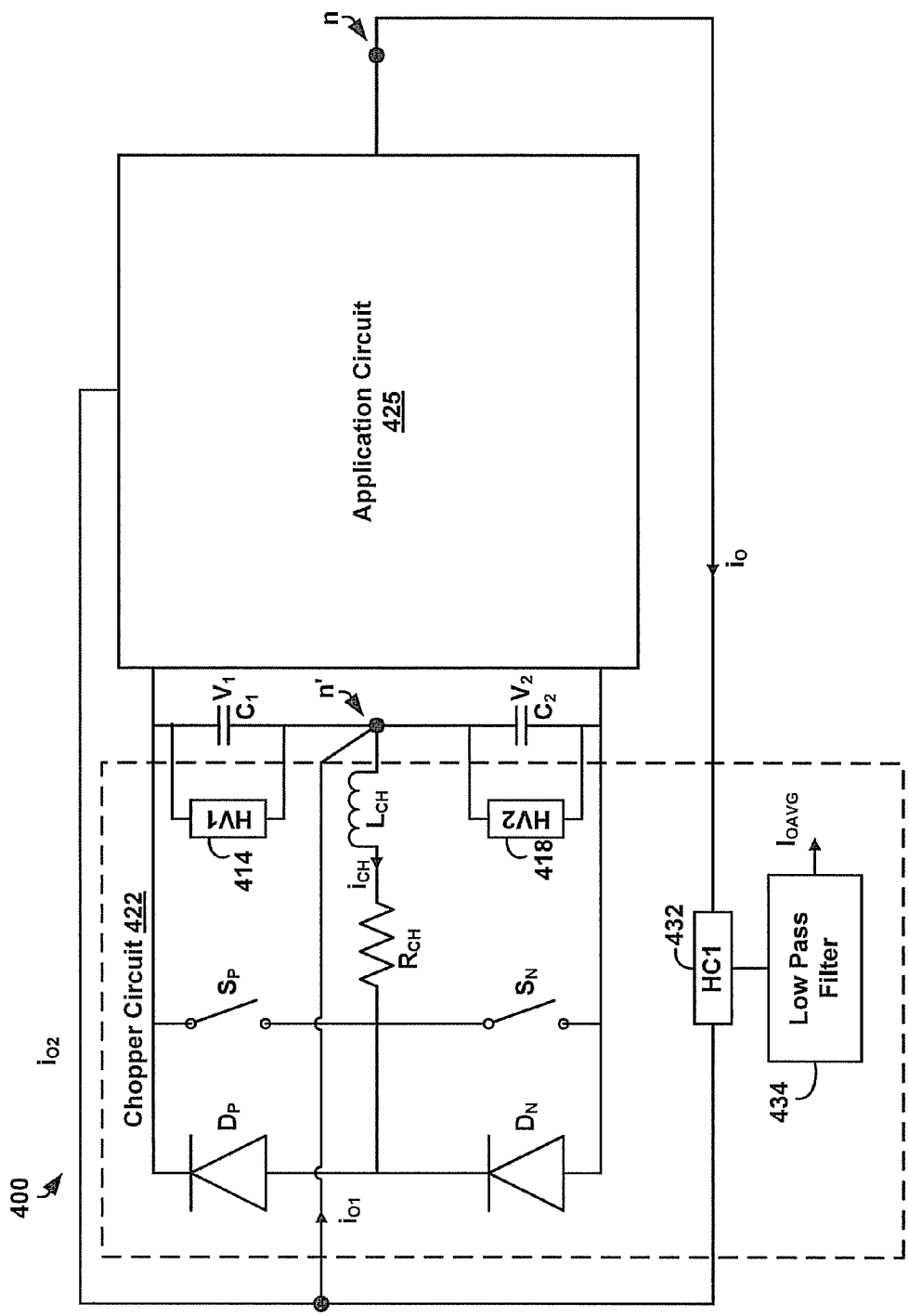
FIG. 4 is an example electronic device that includes a chopper circuit to balance voltages across capacitors of an example application circuit.

FIG. 4 is an example electronic device 400 that includes a chopper circuit 422 to balance voltages of capacitors of an example application circuit 425. The application circuit may be a voltage source inverter, multilevel inverter as well as devices that include ultra-capacitors, and capacitor banks. The example chopper circuit 422 may include circuit components such as diodes $D_P$ and $D_N$, switches $S_P$ and $S_N$, chopper resistor $R_{CH}$, chopper inductor $L_{CH}$, Hall effect voltage sensors HV1 414 and HV2 418, Hall effect current sensor HC1 432, and a low pass filter 434. In addition, to Hall effect sensors, those skilled in the art would understand that other methods of sensing voltage and current could also be used. The electronic device 400 includes the application circuit 425 that has several circuit components such as capacitors $C_1$ and $C_2$, as well other circuit components.

The chopper circuit 422 may balance the charge between capacitors $C_1$ and $C_2$ by controlling the switches $S_P$ and $S_N$. For example, when capacitor $C_1$ is detected to be overcharged and capacitor $C_2$ is detected to be undercharged, switch $S_P$ may be closed. Consequently, charge stored in capacitor $C_1$ is discharged and current $i_{CH}$ flows from capacitor, $C_1$, to chopper inductor, $L_{CH}$. Further, chopper inductor $L_{CH}$ is charged until voltage across capacitor, $C_1$, is substantially close to a reference voltage based on a DC power source (not shown). Subsequently, switch $S_P$ is opened causing chopper inductor $L_{CH}$ to discharge and current to flow through diode $D_N$ to capacitor $C_2$, thereby charging capacitor $C_2$. When the chopper inductor $L_{CH}$ is substantially discharged, the voltage across capacitor $C_2$ may be substantially balanced with the voltage across capacitor $C_1$. Note that the diodes $D_N$ and $D_P$ function as one-way switches. Thus, persons of ordinary skill in the art would understand that other circuit components that function as one-way switches may be used instead of diodes $D_N$ and $D_P$.

Controlling and coordination of switches Sp and $S_N$ are based on voltages $V_1$ and $V_2$ across capacitors $C_1$ and $C_2$, respectively, and a DC component of AC output current, $i_o$. Hall effect transducers or sensors HV1 414 and HV2 418 are coupled to the VSI 424 to detect or measure the voltages across capacitors $C_1$ and $C_2$. Further, HC1 432 is a Hall effect transducer that detects or measures the AC output current, $i_o$. In addition, a portion of the output current, $i_o$, namely, $i_{o1}$, is placed in feedback with the VSI 435 at node "n'". After being detected by Hall effect current transducer HC1 432, $i_o$, is passed through a low pass filter 434 which provides as an output a DC component of the AC output current, $I_{OAVG}$. The values of $V_1$, $V_2$, and $I_{OAVG}$ may be provided as input parameters for a chopper control unit as shown FIG. 5.

Figure 5:
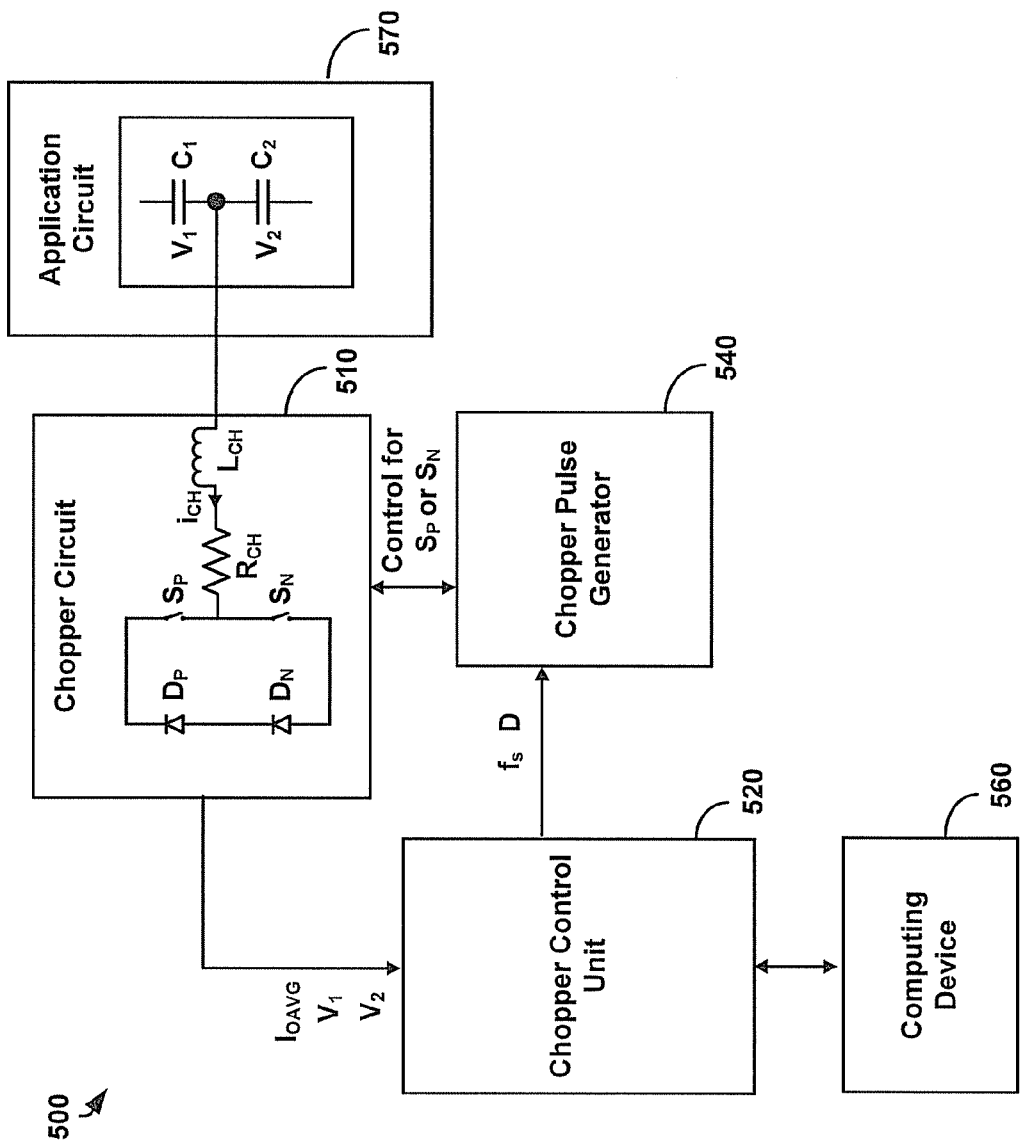
FIG. 5 is a functional block diagram of an example chopper circuit, chopper control unit, chopper pulse generator, and a computing device used to balance voltages across capacitors in an application circuit.

FIG. 5 is a functional block diagram 500 of a chopper circuit 510, chopper control unit 520, chopper pulse generator 540, and a computing device 560 used to balance voltages $V_1$ and $V_2$ across capacitors $C_1$ and $C_2$ of an application circuit 570. Further, the application circuit 570 may be a voltage source inverter, multilevel inverter as well as devices that include ultra-capacitors, and capacitor banks. The chopper control unit 520 may receive various parameters, such as $I_{OAVG}$, $V_1$, and $V_2$, from a chopper circuit 510 coupled to the application circuit 570. $I_{OAVG}$ may be the DC component of an output current for the application circuit 570 (See FIG. 4).

The chopper control unit 520 may process and provide parameters, $f_s$ and D, to the chopper pulse generator 540. Subsequently, the chopper pulse generator 540 processes the input parameters $f_s$ and D and may provide control signals to chopper circuit 510 to coordinate and control switches $S_P$ and $S_N$ thereby balancing voltages of capacitors $C_1$ and $C_2$. A computer or computing device 560 may be coupled to the chopper control unit 520 to provide further control of the chopper control circuit 520 and/or processing of the parameters $I_{OAVG}$, $V_1$, $V_2$ and $f_s$ and D. Alternatively, the chopper control unit 520 may be a part of a computer or computing device.

The chopper control unit 520 may process the input parameters $V_1$, $V_2$, and $I_{OAVG}$ in different ways using a digital signal processor and other electronic circuits. $I_{OAVG}$ may be used by the chopper control unit 520 to generate a signal that represents current, $i_{CH}$ that charges and discharges an inductor, such as the chopper inductor $L_{CH}$ of the chopper circuit 510.

Figure 6A:
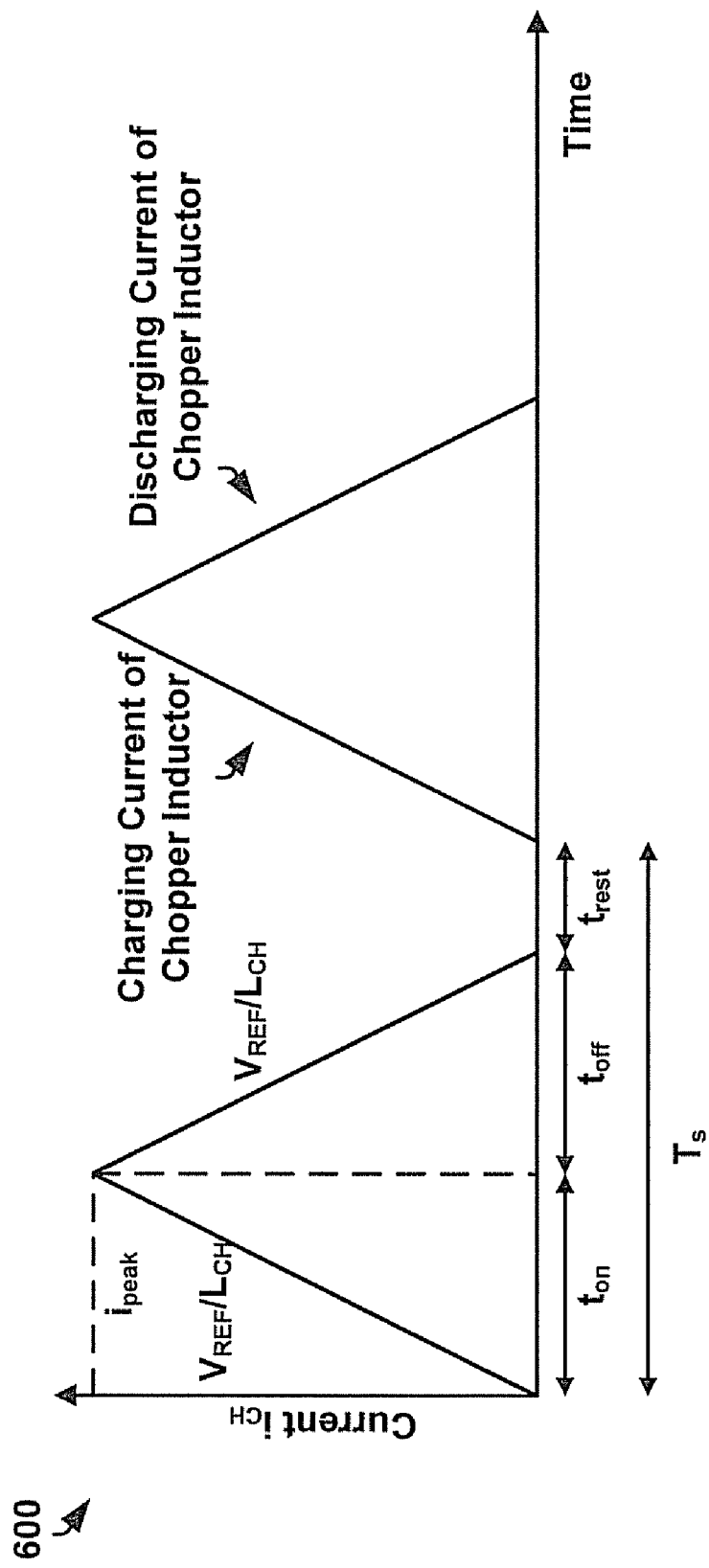
FIG. 6A is an example graph of a substantially triangular carrier waveform.

In describing FIGS. 6A-C, reference may be made to components illustrated in FIG. 5. FIG. 6A shows a graph 600 of example triangular carrier waveform. A signal representing a chopper inductor current, $i_{CH}$ may be generated by the chopper control unit 520 based on the received $I_{OAVG}$ parameter.

Further, the signal may be represented by a substantially triangular carrier waveform (also called a carrier signal) because the chopper inductor current, $i_{CH}$ may have an equal rate of rise and fall based on a voltage $V_{REF}$ and inductor value of the chopper inductor, $L_{CH}$. Analyzing the carrier signal in FIG. 6A, the $I_{OAVG}$ current may be given by the following equation:

$$I_{oavg} = \frac{\frac{1}{2}(I_{peak})(t_{on} + t_{off})}{T_s} \quad (3)$$

where, $I_{peak}$, $t_{on}$, and $t_{off}$ are peak chopper current, on and off time for the chopper switches $S_N$ or $S_P$, respectively, and $T_s$ is a time period of the carrier signal. Further, switching frequency, $f_s$, is inverse to the time period, $T_s$.

Assuming that $t_{on}=t_{off}=T_s/2$ (or duty cycle D=0.5), the $I_{OAVG}$ current may be given by:

$$I_{oavg} = \frac{\frac{1}{2}(I_{peak})(2t_{on})}{T_s} \quad (4)$$

A duty cycle D=0.5 may be used because in a steady state operation of a chopper circuit 510 because the capacitors $C_1$ and $C_2$ of the application circuit 570 fluctuate around a reference value. Thus, any error when compared to a reference voltage would be substantially constant. Simplifying equation (4) reveals:

$$\frac{I_{oavg}}{I_{peak}} = D; \; D = \frac{t_{on}}{T_s}; \; T_s = t_{on} + t_{off} + t_{rest} \quad (5)$$

where $t_{rest}$ is the period in between the switch $S_N$ or $S_P$ is on or off. Further, based on $i_{CH}$, $$I_{peak} = \frac{V_{ref}}{L_{ch}} t_{on}; \; t_{on} = \frac{L_{ch}}{V_{ref}} I_{peak} \quad (6)$$

From equation (5), $t_{on}$ can be expressed as $$t_{on} = DT_s; \; f_s \frac{D}{t_{on}} \quad (7)$$

Substituting the value of $t_{on}$ from equation (6) reveals:

$$f_s = \frac{D * V_{ref}}{I_{peak} * L_{ch}} \quad (8)$$

The switching frequency, fs, provides the frequency of the triangular carrier waveform in FIG. 6A. Note that as $I_{peak}$ increases, the value of D decreases, from equation (5). This implies that a higher peak current value requires a lower duty cycle, to achieve the same capacitor balancing effect. Further, D from equation (8) is directly proportional to the frequency of the triangular carrier waveform. Therefore as D decreases, $t_{on}$ decreases, the switching frequency $f_s$ also decreases, and the error increases as the time of operation of the switches $S_P$ and $S_N$ decreases. Voltage error is the difference between a voltage across a capacitor (e.g., $C_1$) and a reference voltage ($V_{REF}$) of a capacitor (e.g., $C_1$ or $C_2$) based on a DC power source. There is a trade off between decreasing duty cycle, D, and capacitor voltage error. Values of D between about 0.3 and about 0.5 may be used in such an example chopper control unit to substantially discharge the chopper inductor $L_{CH}$ of chopper circuit 510 in FIG. 5 when transferring charge between capacitors $C_1$ and $C_2$, thereby substantially balancing the voltage across capacitors $C_1$ and $C_2$, for example.

Otherwise, if the chopper inductor, $L_{CH}$, is not substantially discharged, then the chopper inductor, $L_{CH}$, may be damaged and/or subsequent balancing of the voltages of capacitors $C_1$ and $C_2$ in FIG. 5 may be inhibited. For example, if chopper inductor, $L_{CH}$, is not substantially discharged in a previous cycle, then the charge already accumulated in the chopper inductor, $L_{CH}$, during the previous cycle may be added to the charge which is accumulated in a current cycle. As the charging of chopper inductor, $L_{CH}$, continues through subsequent cycles, the accumulated charge in the chopper inductor, $L_{CH}$, may continue to increase leading to possibly damaging the chopper inductor, $L_{CH}$. A way to prevent damage to the chopper inductor, $L_{CH}$, may be to ensure that the charge through the chopper inductor, $L_{CH}$, is substantially discharged. In other words the chopper inductor circuit may operate in discontinuous conduction mode, with a duty cycle D less than 0.5, or a $t_{rest}>0$.

From equation (8) the switching frequency, $f_s$, for a chosen duty cycle, D, is obtained. Further, a substantially triangular carrier waveform is generated representing the charge of chopper inductor $L_{CH}$ of a chopper circuit 510 and may be used to balance voltages across capacitors $C_1$ and $C_2$ as shown in FIG. 5. Specifically, the generated triangular carrier waveform is compared with a calculated error signal, such as for example either $V_1$-$V_{ref}$ or $V_2$-$V_{REF}$, where $V_1$ and $V_2$ are measured capacitor voltages across $C_1$ and $C_2$ that are sensed by Hall effect transducers (See FIG. 4) of the chopper circuit 510, and $V_{REF}$ is a reference voltage (based on the DC power source), all of which may be inputs to a chopper control unit 520. For example, if $I_{OAVG}$ received by the chopper control unit 520 (See FIG. 5) has a negative polarity, then capacitor $C_1$ is overcharged and the positive error signal $V_1$-$V_{REF}$ is provided to the chopper control unit 520 and compared with a substantially triangular carrier waveform representing charge of the chopper inductor, $L_{CH}$. Conversely, if $I_{OAVG}$ received by the chopper control unit 520 has a positive polarity, then capacitor $C_2$ is overcharged and the positive error signal $V_2$-$V_{REF}$ is provided to the chopper control unit 520 and compared with the substantially triangular carrier waveform. The comparison of voltage error signal of a capacitor to a substantially triangular carrier waveform representing the charge of the chopper inductor $L_{CH}$ is further explained in describing FIGS. 6B and 6C.

An example error signal and the corresponding switching pulses are shown in FIGS. 6B and 6C. The triangular carrier waveform in FIG. 6A represents the current flowing through the chopper inductor, $L_{CH}$ of chopper circuit 510 in FIG. 5. However, the triangular carrier waveform generated and given to the chopper control unit 520 represents the error signal to the chopper. The error signal in FIG. 6B may be the difference between $V_1$, the voltage across capacitor, $C_1$ in FIG. 5 and $V_{REF}$, a reference voltage value. At a time instance, $t_A$, when the error signal is greater than the triangular carrier waveform, capacitor $C_1$ is overcharged. Consequently, switch $S_P$ is closed, as shown in FIG. 6C, by a chopper control unit 520 such that capacitor $C_1$ is discharging and the chopper inductor, $L_{CH}$, is charging. At another time instance, $t_B$, when the error signal $V_1$-$V_{REF}$ is less than the triangular carrier waveform, capacitor $C_1$ is discharged to a value substantially close to the reference voltage, $V_{REF}$. Hence, the switch $S_P$ is opened (See FIG. 6C) such that the chopper inductor, $L_{CH}$ is discharged through diode $D_N$ and capacitor $C_2$ is charged thereby substantially balancing capacitors $C_1$ and $C_2$.

A triangular carrier waveform may be used to substantially discharge a chopper inductor, $L_{CH}$, because the triangular carrier waveform is a symmetrical and can be generated by the chopper control unit 520. Further, the triangular carrier waveform may be used such that the frequency of the switch is decided by the frequency of the triangular carrier waveform. As the triangular carrier waveform operates at a higher frequency than the frequency of the application circuit 570, the charging and discharging of the capacitors are faster than the system and hence chopper circuit effect on the system is minimized. Further, Pulse Width Modulation (PWM) is achieved for the switches $S_P$ or $S_N$. That is, as the error increases, the width of the pulses increase and hence the corresponding switch, Sp or $S_N$, is operated for more time based on the duty cycle D and peak current $I_{peak}$ The results of comparing the first error signal value and the second error signal value with the substantially triangular carrier waveform as well as the resulting position of switch $S_P$ is summarized in Table 1.

TABLE 1

| Comparison of Error Signal Values with Triangular Carrier Waveform | Position of Switch $S_P$ |
|---|---|
| First Error Signal Value > Triangular Carrier Waveform | Closed |
| Second Error Signal Value < Triangular Carrier Waveform | Open |

Switch $S_N$ of chopper circuit 510 in FIG. 5 operates in the same manner as switch $S_P$ when capacitor $C_2$ is overcharged and capacitor $C_1$ is undercharged.

Figure 7:
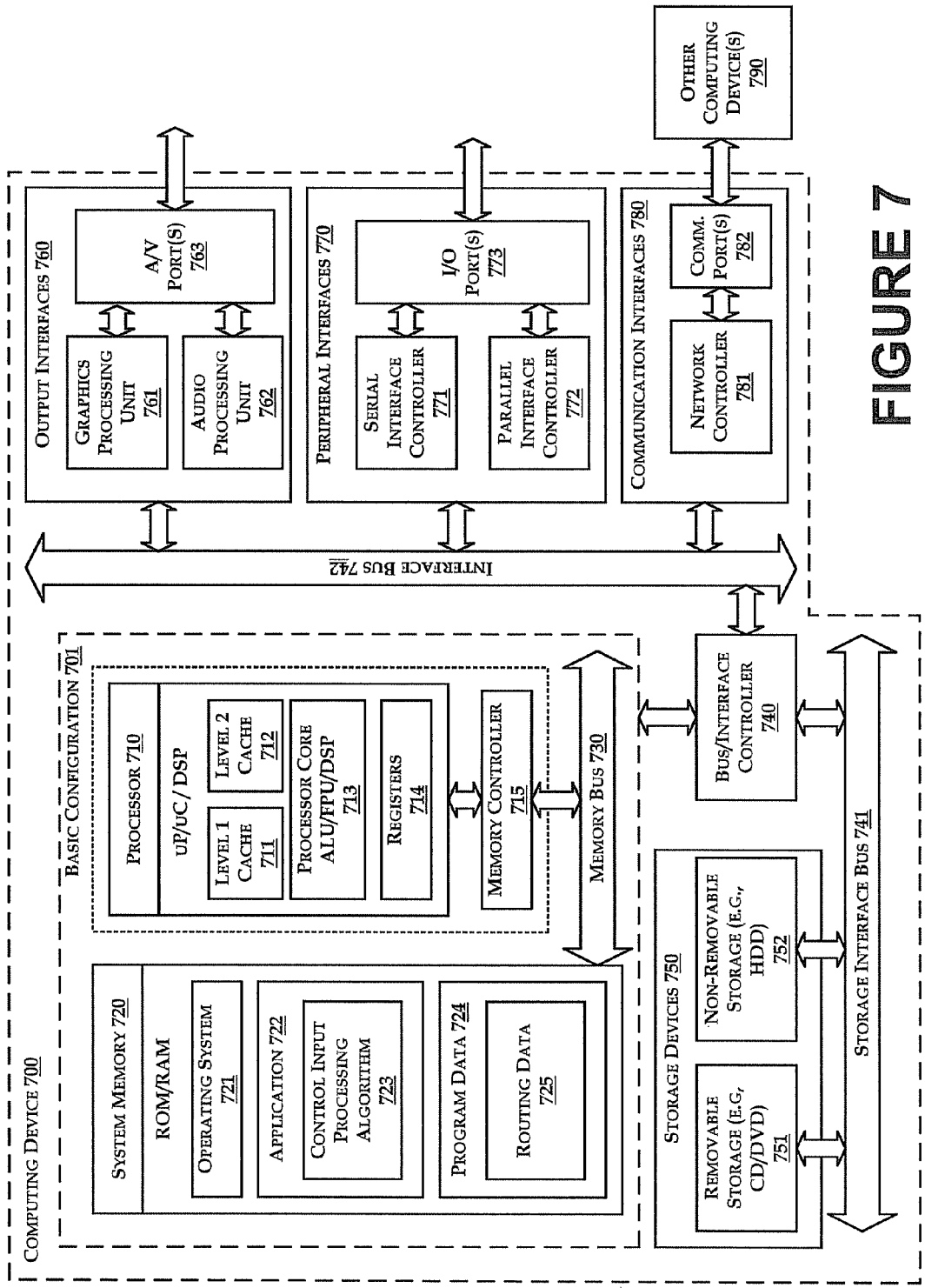
FIG. 7 is a block diagram illustrating an example computing device that is used to control the chopper circuit.

FIG. 7 is a block diagram illustrating an example computing device 700 that may be used as part of, or in conjunction with, a chopper control unit for balancing voltages across capacitors in an inverter. In a basic configuration 701, computing device 700 typically includes one or more processors 710 and system memory 720. A memory bus 730 can be used for communicating between the processor 710 and the system memory 720. Depending on the desired configuration, processor 710 can be of any type including but not limited to a microprocessor (μP), a microcontroller (μC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes control input processing algorithm 723 that is arranged to provide inputs to the electronic circuits, in accordance with the present disclosure. Program Data 724 includes control input data 725. In some example embodiments, application 722 can be arranged to operate with program data 724 on an operating system 721 such that power consumption by an electronic circuit is minimized. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Exemplary computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Exemplary output interfaces 760 include a graphics processing unit 761 and an audio processing unit 762, which can be configured to communicate to various external devices such as a display or speakers via one or more A/V ports 763. Exemplary peripheral interfaces 760 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An exemplary communication interface 780 includes a network controller 781, which can be arranged to facilitate communications with one or more other computing devices 790 over a network communication via one or more communication ports 782. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

Figure 8:
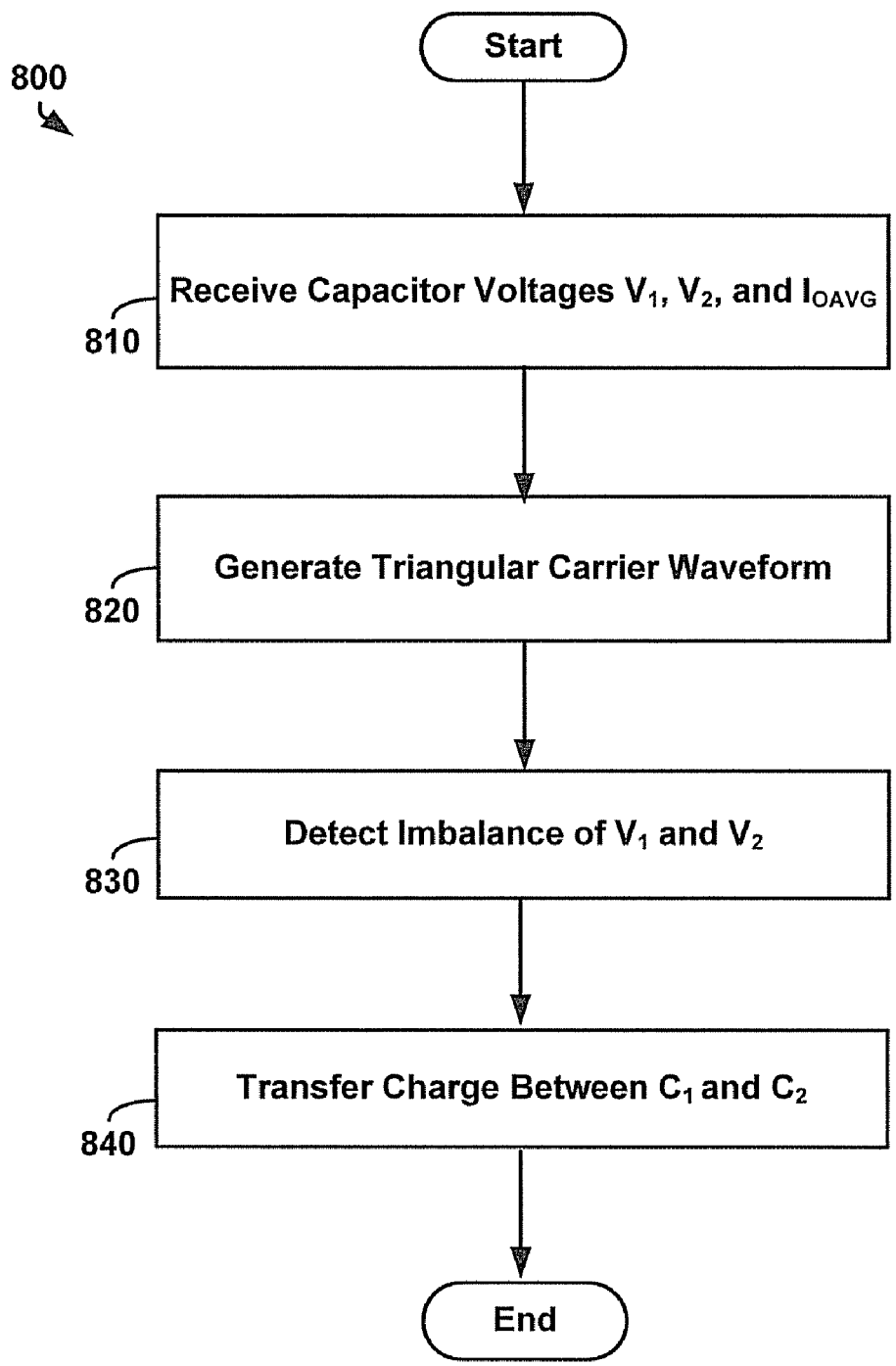
FIGS. 8 and 9 are flowcharts of example methods for balancing voltages across capacitors of an application circuit.
Figure 9:
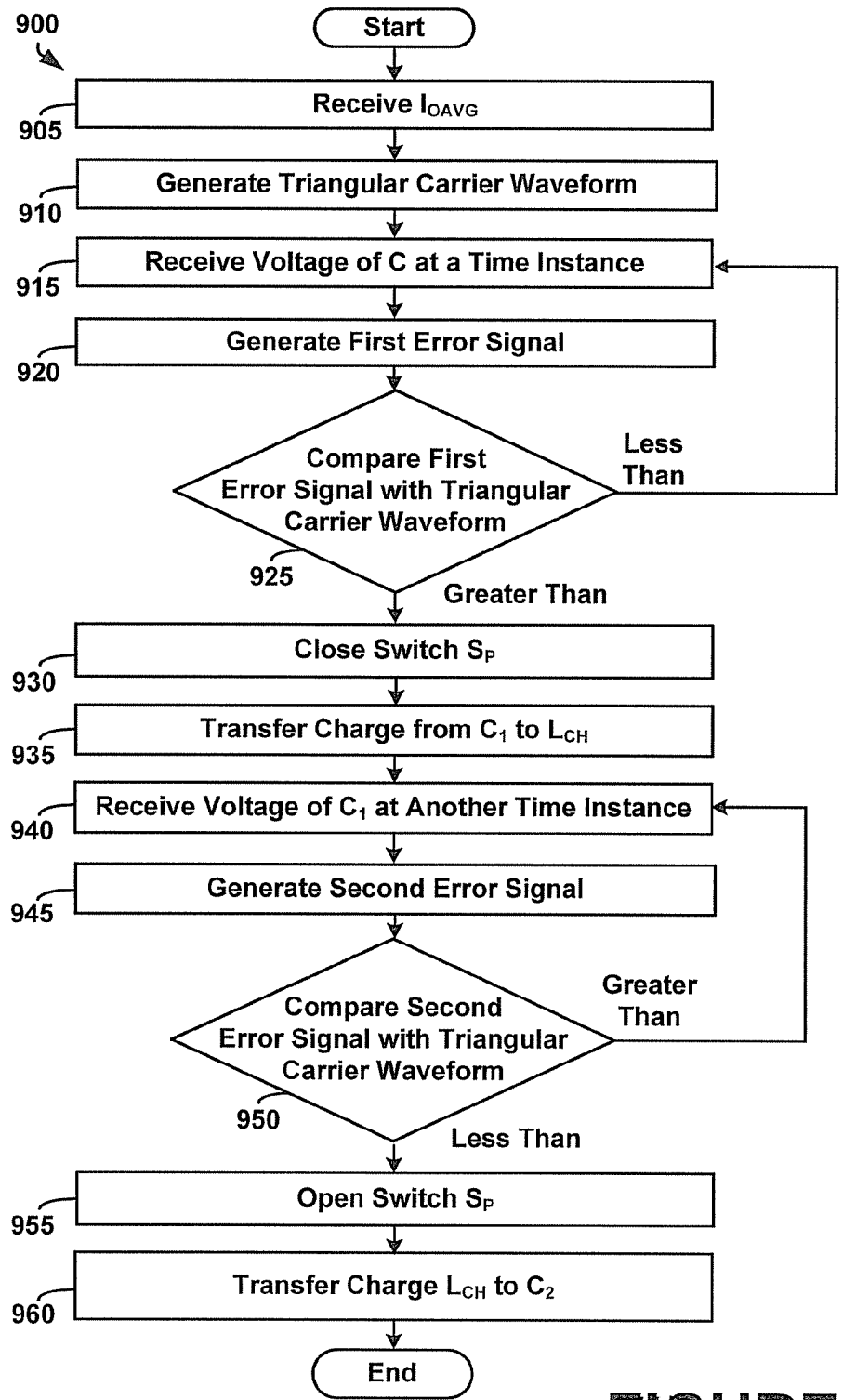
Figure 7:
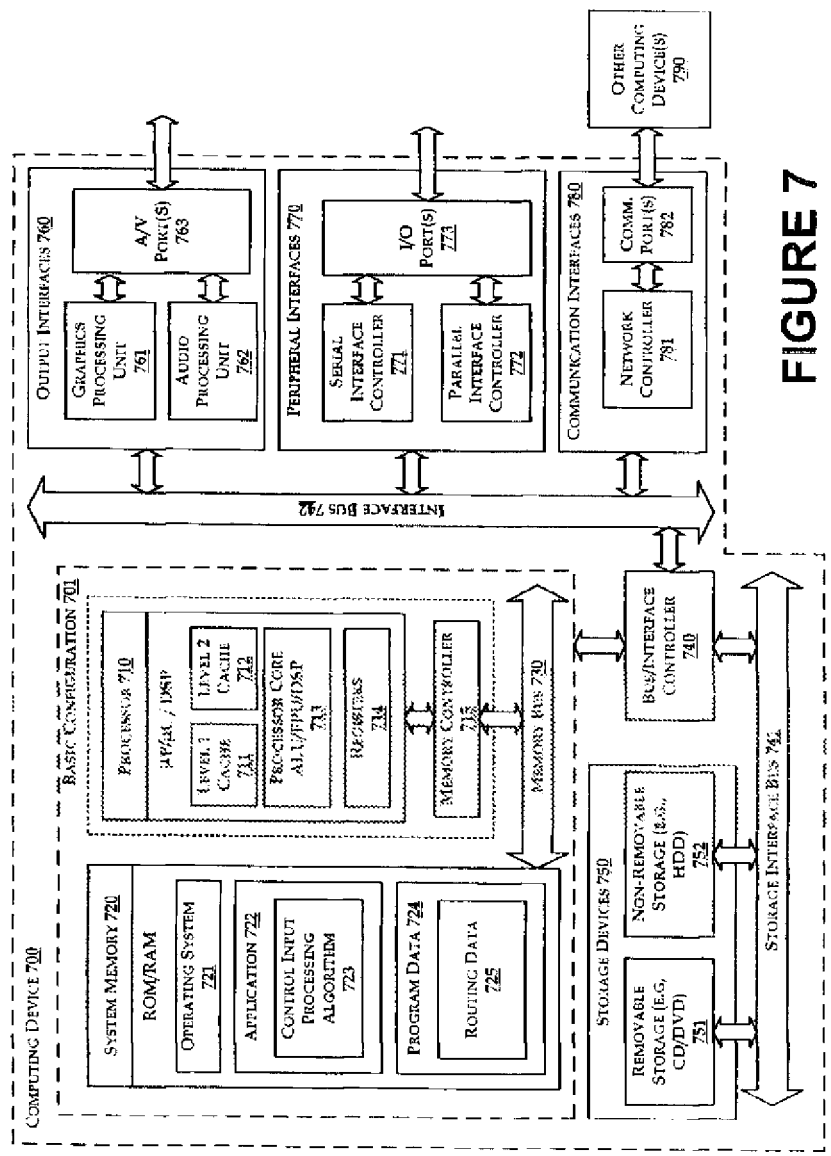

FIG. 8 and FIG. 9 are flowcharts of example methods (800, 900) for balancing the capacitors in an application circuit, such as a voltage source inverter. The steps in the example methods (800, 900) may be implemented by an electronic device that includes a chopper circuit, chopper control unit, chopper pulse generator, and a computing device. The example methods (800, 900) will be described with reference to components illustrated in FIG. 5.

With reference to the flowchart of FIG. 8, initially, voltages $V_1$ and $V_2$ across capacitors $C_1$ and $C_2$ of the application circuit 570 as well as the output current, $I_{OAVG}$, are detected by a chopper circuit 510 and are forwarded to and received by a chopper control unit 520, as shown in block 810. The chopper control unit 520 receives the voltages $V_1$ and $V_2$ and the current $I_{OAVG}$, and a substantially triangular carrier waveform is generated based on the duty cycle D and the peak chopper current $I_{peak}$ of chopper circuit 510, as shown in block 820. Further, the signal has a switching frequency and a duty cycle based on $I_{OAVG}$. Additionally, the chopper control unit 520 detects an imbalance between voltages $V_1$ and $V_2$ based on a polarity of $I_{OAVG}$, as shown in block 830. For example, if $I_{OAVG}$ has a negative polarity then there is an imbalance in charge between capacitors $C_1$ and $C_2$ such that $C_1$ is overcharged and $C_2$ is undercharged. However, if $I_{OAVG}$ has a positive polarity then there is an imbalance in charge between capacitors $C_1$ and $C_2$ such that $C_2$ is overcharged and $C_1$ is undercharged, for example.

In addition, the chopper control unit 520 controls the chopper circuit 510, through a chopper pulse generator 540, to transfer charge between capacitors $C_1$ and $C_2$ using the chopper inductor $L_{CH}$ of the chopper circuit 510 based on the imbalance between voltages $V_1$ and $V_2$, as shown in block 840. Charge is transferred such that the chopper inductor, $L_{CH}$, is substantially discharged based on the switching frequency and the duty cycle of the signal representing charge of the chopper inductor, $L_{CH}$ simultaneously charging the capacitor which has lower voltage.

FIG. 9 is another flowchart of an example method 900 for balancing voltages across capacitors of an application circuit 570 such as a voltage source inverter. Initially, a chopper control unit 520 receives $I_{OAVG}$ from chopper circuit 510, as shown in block 905. The chopper control unit 520 may then generate a substantially triangular carrier waveform based on the duty cycle D and the peak chopper current $I_{peak}$, as shown in block 910. Further, the triangular carrier waveform may have a switching frequency and a duty cycle based on $I_{OAVG}$. A chopper control unit 520 receives a voltage across capacitor $C_1$ of the application circuit 570 at a particular time instance from chopper circuit 510, as shown in block 915. For example, the chopper control unit 520 may receive a voltage, $V_{1A}$, across capacitor $C_1$ of application circuit 570 at a time instance $t_A$. Further, the chopper control unit 520 generates a first error signal value that may be the difference between voltage $V_{1A}$ and a reference voltage, as shown in block 920. The reference voltage may be dependent upon a DC power source coupled to the application circuit 570.

Additionally, the chopper control unit 520 may compare the value of first error signal at time instance $t_A$ with the value of the triangular carrier waveform representing charge of chopper inductor $L_{CH}$ at time instant $t_A$, as shown in block 925. If the value of the first error signal is greater than the value of the triangular carrier waveform representing charge of chopper inductor $L_{CH}$, then capacitor $C_1$ is overcharged. Thus, the example method 900 may include a chopper circuit closing switch $S_P$, as shown in block 930. However, if the value of the first error signal is less than the value of the triangular carrier waveform representing charge of chopper inductor $L_{CH}$, then capacitor $C_1$ is not overcharged and therefore, switch $S_P$ remains open. Next, the example method 900 may include chopper control unit 520 receiving another voltage measurement across capacitor $C_1$ at a separate time instance 915.

Closing the switch $S_P$ of chopper circuit 510, as shown in block 930, results in charge (current) to be transferred (flow) from capacitor $C_1$ of the application circuit 570 to chopper inductor $L_{CH}$ of the chopper circuit 510, as shown in block 935. The example method 900 may further include the chopper control unit 520 receiving another voltage across capacitor $C_1$ at a different time instant, as shown in block 940. For example, the chopper control unit 520 may receive voltage $V_{1B}$ across capacitor $C_1$ at a time instant $t_B$. Further, the chopper control unit 520 generates a second error signal value that may be the difference between voltage $V_{1B}$ and the reference voltage, as shown in block 945.

Additionally, the chopper control unit 520 may compare the value of second error signal at time instance $t_B$ with the value of the triangular carrier waveform signal representing charge of chopper inductor $L_{CH}$ at time instant $t_B$, as shown at block 950. If the value of the second error signal is less than the value of the triangular carrier waveform signal representing charge of chopper inductor $L_{CH}$, then capacitor $C_1$ of the application circuit 570 has been discharged substantially close to the reference voltage. Thus, the example method 900 may include the chopper circuit 510 opening the switch $S_P$, as shown in block 955. However, if the value of the first error signal is greater than the value of the triangular carrier waveform signal representing charge of chopper inductor $L_{CH}$, then capacitor $C_1$ has not discharged to a value substantially close to the reference voltage. Thus, the example method 900 may include the chopper control unit 520 receiving another voltage measurement across capacitor $C_1$ at a separate time instance 940. Opening the switch $S_P$, as shown in block 955, results in charge (current) to be transferred (flow) from chopper inductor $L_{CH}$ to capacitor $C_2$, as shown in block 960, through diode $D_N$ of the chopper circuit 510. Further, the chopper inductor $L_{CH}$ is substantially discharged during the charge transfer between the chopper inductor $L_{CH}$ and the capacitor $C_2$, In general, it should be understood in the circuits described herein, capacitors can be any suitable charge storage devices, including but not limited to capacitors, ultra-capacitors, capacitor banks. Further, a diode can be any circuit component that can function as a one-way switch. In addition, control circuits can be implemented using DSP, FPGA, ASIC or any other types of circuits. $V_1$, $V_2$ and $I_{OAVG}$ may be measured by Hall effect transducers, or any other suitable measurement techniques or devices. Although VSI application is discussed in detail, the techniques could be used in any capacitor balancing application.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof.

Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device for balancing voltages of capacitors in an electronic circuit, the device comprising:
    a chopper circuit including a chopper inductor, the chopper circuit measuring a first voltage of a first capacitor of the electronic circuit, a second voltage of a second capacitor of the electronic circuit, and an output current of the electronic circuit; and
    a chopper control unit receiving the output current and generating a signal representing charging of the chopper inductor based on the output current, the signal having a switching frequency and a duty cycle, the chopper control unit receiving the first voltage and the second voltage and detecting an imbalance between the first voltage and the second voltage based on a polarity of the output current, the chopper control unit controlling transfer of charge between the first capacitor and the second capacitor using the chopper inductor based on the imbalance between the first voltage and second voltage and based on the signal representing charging of the chopper inductor.

2. The device of claim 1, wherein the chopper inductor is substantially discharged based on the switching frequency and the duty cycle during the transfer of charge between the first capacitor and the second capacitor.

3. The device of claim 1, wherein the chopper circuit includes at least one switch and at least one diode to transfer charge between the first capacitor and the second capacitor using the chopper inductor.

4. The device of claim 3, further comprising a chopper pulse generator receiving the switching frequency and the duty cycle, and configured to control a first switch, a first diode, a second switch, and a second diode to transfer charge between the first capacitor to the second capacitor.

5. The device according to claim 1, wherein the signal representing charging of the chopper inductor is a substantially triangular carrier waveform based on a voltage of the chopper inductor, inductance of the chopper inductor, and the output current such that the switching frequency and the duty cycle of the substantially triangular carrier waveform allows for the chopper inductor to be substantially discharged when transferring charge between the first capacitor and the second capacitor, wherein the switching frequency and duty cycle is based on the output current and an error signal based on the first voltage and a reference voltage.

6. The device according to claim 1, wherein the imbalance of the first voltage and the second voltage is based on a reference voltage of at least one of the first capacitor and the second capacitor.

7. The device according to claim 1, further comprising a computing device coupled to the chopper control unit, the computing device further controlling the transfer of charge between the first capacitor and the second capacitor.

8. A method for balancing voltages of capacitors in an electronic circuit, the method comprising:
    receiving a first voltage of a first capacitor of the electronic circuit, a second voltage of a second capacitor of the electronic circuit, and an output current of the electronic circuit;
    generating a signal representing charging of an inductor based on the output current, the signal having a switching frequency and a duty cycle;
    detecting an imbalance between the first voltage and the second voltage based on a polarity of the output current; and
    based on the imbalance between the first voltage and the second voltage and based on the signal representing charging of the inductor, causing transfer of charge between the first capacitor and the second capacitor using the inductor.

9. The method of claim 8, wherein the inductor is substantially discharged based on the switching frequency and the duty cycle during transfer of charge between the first capacitor and the second capacitor and the signal representing charge of the inductor is a substantially triangular carrier waveform.

10. The method of claim of 8, further comprising:
    receiving the first voltage across the first capacitor at a first time instance;
    generating a first error signal value based on the first voltage and a reference voltage;
    comparing the first error signal value to the signal representing charging of the inductor; and
    causing a first current to flow from the first capacitor to the inductor.

11. The method of claim of 10, further comprising:
    receiving a third voltage across the first capacitor at a second time instance;
    generating a second error signal value based on the third voltage and the reference voltage;
    comparing the second error signal value to the signal representing charging of the inductor; and
    causing a second current to flow from the inductor to the second capacitor.

12. The method of claim 10 further comprising:
    closing a first switch to cause the first current to flow from the first capacitor to the inductor, thereby discharging the first capacitor and charging the inductor; and
    opening the first switch to cause the second current to flow from the inductor through a first diode to the second capacitor thereby discharging the inductor and charging the second capacitor.

13. The method of claim 8 further comprising:
    calculating the switching frequency and the duty cycle of the substantially triangular carrier waveform based on the output current; and
    providing the switching frequency and a duty cycle of the substantially triangular carrier waveform.

14. The method of claim 8 further comprising controlling transfer of charge between the first capacitor and the second capacitor using a computing device.

15. A computer-readable medium having stored thereon, computer-executable instructions that, when executed by a device, cause the device to perform functions comprising:
- receiving a first voltage of a first capacitor of an electronic circuit, a second voltage of a second capacitor of the electronic circuit, and an output current of the electronic circuit;
- generating a signal representing charging of an inductor based on the output current, the signal having a switching frequency and a duty cycle;
- detecting an imbalance between the first voltage and the second voltage based on a polarity of the output current;
- based on the imbalance between the first voltage and the second voltage and based on the signal representing charging of the inductor, causing transfer of charge between the first capacitor and the second capacitor using the inductor, wherein the inductor is substantially discharged based on the switching frequency and the duty cycle during transfer of charge between the first capacitor and the second capacitor;
- wherein the signal representing charge of the inductor is a substantially triangular carrier waveform.

16. The computer-readable medium of claim 15, wherein the inductor is substantially discharged based on the switching frequency and the duty cycle during transfer of charge between the first capacitor and the second capacitor.

17. The computer-readable medium of claim 15, wherein the functions further comprise:
- receiving the first voltage across the first capacitor at a first time instance;
- generating a first error signal value based on the first voltage and a reference voltage;
- comparing the first error signal value to the signal representing charging of the inductor; and
- causing a first current to flow from the first capacitor to the inductor.

18. The computer-readable medium of claim 17, wherein the functions further comprise:
- receiving a third voltage across the first capacitor at a second time instance;
- generating a second error signal value based on the third voltage and the reference voltage;
- comparing the second error signal value to the signal representing charging of the chopper inductor; and
- causing a second current to flow from the inductor to the second capacitor.

19. The computer-readable medium of claim 18, wherein the functions further comprise:
- closing a first switch to cause the first current to flow from the first capacitor to the inductor, thereby discharging the first capacitor and charging the inductor; and
- opening the first switch to cause the second current to flow from the chopper inductor through a first diode of the chopper circuit to the second capacitor thereby discharging the inductor and charging the second capacitor.

20. The computer-readable medium of claim 15, wherein the functions further comprise:
- calculating the switching frequency and the duty cycle of the substantially triangular carrier waveform based on the output current; and
- providing the switching frequency and a duty cycle of the substantially triangular carrier waveform.

* * * * *

UNITED STATES PATENT AND TRADEMARK OFFICE
CERTIFICATE OF CORRECTION

PATENT NO. : 8,294,306 B2
APPLICATION NO. : 12/725053
DATED : October 23, 2012
INVENTOR(S) : Kumar et al.

It is certified that error appears in the above-identified patent and that said Letters Patent is hereby corrected as shown below:

On the Title Page, in item (56), under "OTHER PUBLICATIONS", in Column 2, Line 19, delete "Drives, 2009." and insert -- Drives, 2009, --, therefor.

On Page 2, in item (56), under "OTHER PUBLICATIONS", in Column 2, Line 1, delete ""Shor-Cicuit" and insert -- "Short-Circuit --, therefor.

On Page 2, in item (56), under "OTHER PUBLICATIONS", in Column 2, Line 1, delete "Inverer Drving" and insert -- Inverter Driving --, therefor.

On Page 2, in item (56), under "OTHER PUBLICATIONS", in Column 2, Line 2, delete "Poc." and insert -- Proc. --, therefor.

In the drawings:

Sheet 8 of 10 should be deleted and replaced with the attached sheet.

In the Specification:

In Column 3, Line 9, delete "which" and insert -- which form --, therefor.

In Column 4, Line 13, delete "$i_{o2}$," and insert -- $i_{o2}$ --, therefor.

In Column 5, Line 45, delete "and given as the follows equation." and insert -- , which can be given by the following equation: --, therefor.

In Column 6, Line 38, delete "Sp" and insert -- $S_p$ --, therefor.

In Column 7, Line 18, delete "$i_{CH}$" and insert -- $i_{CH}$, --, therefor.

Signed and Sealed this
Seventh Day of May, 2013

Teresa Stanek Rea
*Acting Director of the United States Patent and Trademark Office*

CERTIFICATE OF CORRECTION (continued)
U.S. Pat. No. 8,294,306 B2

In Column 8, Line 14, delete "fs," and insert -- $f_s$, --, therefor.

In Column 9, Line 41, delete "Sp" and insert -- $S_p$ --, therefor.

In Column 9, Line 42, delete "$I_{peak}$" and insert -- $I_{peak}$. --, therefor.

In Column 11, Line 66, delete "$L_{CH}$" and insert -- $L_{CH}$, --, therefor.

In Column 12, Line 51, delete "$t_B$." and insert -- $t_B$, --, therefor.

In Column 13, Line 4, delete "$C_2$," and insert -- $C_2$. --, therefor.

In the Claims

In Column 16, Line 33, in Claim 10, delete "claim of" and insert -- claim --, therefor.

In Column 16, Line 42, in Claim 11, delete "claim of" and insert -- claim --, therefor.